(12) United States Patent
Sebestian et al.

(10) Patent No.: US 7,877,589 B2
(45) Date of Patent: Jan. 25, 2011

(54) CONFIGURING A DEVICE FOR OPERATION ON A COMPUTING PLATFORM

(75) Inventors: Pradeep Sebestian, Beaverton, OR (US); Ram Chary, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1125 days.

(21) Appl. No.: 11/541,224

(22) Filed: Sep. 29, 2006

(65) Prior Publication Data

US 2008/0168264 A1 Jul. 10, 2008

(51) Int. Cl.
*G06F 15/177* (2006.01)
(52) U.S. Cl. ........................................................ 713/1
(58) Field of Classification Search ................ 713/1
See application file for complete search history.

(56) References Cited

U.S. PATENT DOCUMENTS

| | | | |
|---|---|---|---|
| 5,519,831 A | 5/1996 | Holzhammer | |
| 5,551,002 A | 8/1996 | Rosich et al. | |
| 5,850,562 A | 12/1998 | Crump et al. | |
| 5,933,630 A * | 8/1999 | Ballard et al. | 713/1 |
| 5,961,611 A * | 10/1999 | Oh | 710/1 |
| 5,974,546 A | 10/1999 | Anderson | |
| 6,141,728 A | 10/2000 | Simionescu et al. | |
| 6,347,370 B1 | 2/2002 | Grimsrud | |
| 6,698,450 B2 | 3/2004 | Vicars | |
| 6,728,875 B1 | 4/2004 | Aguilar et al. | |
| 6,754,817 B2 | 6/2004 | Khatri et al. | |
| 6,901,298 B1 | 5/2005 | Govindaraj et al. | |
| 6,968,450 B1 | 11/2005 | Rothberg et al. | |
| 7,155,579 B1 * | 12/2006 | Neils et al. | 711/154 |
| 7,210,030 B2 * | 4/2007 | Edrington et al. | 713/1 |
| 7,315,962 B2 | 1/2008 | Neuman et al. | |
| 7,376,949 B2 | 5/2008 | Lowell et al. | |
| 7,418,584 B1 | 8/2008 | Klaiber et al. | |
| 7,673,128 B2 * | 3/2010 | Zimmer et al. | 713/2 |

(Continued)

OTHER PUBLICATIONS

United States Patent Application pending, U.S. Appl. No. 11/540,374, filed Sep. 29, 2006, to Chary et al.
Intel, et al., "Advanced Configuration and Power Interface Specification", *Intel Corporation, Microsoft Corporation, Toshiba Corp.*, (1999), Whole Document.

(Continued)

*Primary Examiner*—Thomas Lee
*Assistant Examiner*—Eric Chang
(74) *Attorney, Agent, or Firm*—Blakely, Sokoloff, Taylor & Zafman LLP

(57) ABSTRACT

A method which includes initializing a device following a power cycle. The initialization includes an agent for the device implementing one or more command sequences to configure the device for operation on a computing platform. The one or more implemented command sequences are recorded and a configuration flag is asserted to indicate the device has been configured for operation on the computing platform. The configuration flag is included in a command configuration register. At least a portion of the recorded one or more command sequences and the command configuration register are stored in a persistent memory that includes non-volatile memory resident on the device. Based on an other power cycle, the device is to access the command configuration register. Based on the command configuration register, the device is to determine whether it is to configure itself by implementing the one or more stored command sequences. The device then configures itself based on that determination. Other implementations and examples are described in this disclosure.

26 Claims, 5 Drawing Sheets

U.S. PATENT DOCUMENTS

| | | |
|---|---|---|
| 2004/0003223 A1 | 1/2004 | Fortin et al. |
| 2004/0064591 A1* | 4/2004 | Noble .................. 709/250 |
| 2004/0123019 A1 | 6/2004 | Garney |
| 2004/0268113 A1 | 12/2004 | Rothman et al. |
| 2005/0081212 A1 | 4/2005 | Goud et al. |
| 2006/0053325 A1 | 3/2006 | Chary et al. |
| 2006/0294351 A1 | 12/2006 | Rostampour |
| 2008/0065845 A1 | 3/2008 | Montero et al. |

OTHER PUBLICATIONS

Tanenbaum, Andrew, "Structured Computer Organization", *Prentice Hall Inc.*, (1984), pp. 10-12.

USPTO, "Office Action for U.S. Appl. No. 11/541,113", mailed Nov. 18, 2008, Whole Document.

USPTO, "Notice of Allowance for U.S. Appl. No. 11/541,113", mailed May 7, 2009, Whole Document.

* cited by examiner

CCR 330

| CF 431 | CSS 432 | CSE 433 | SC 434 | DC 435 | SCS 436 | ICS 437 | RSVD 438 |
|---|---|---|---|---|---|---|---|
| 0 | 1 | 2 | 3 | 4 | 5 | 6 | 7 |

Table 430

| | Decode Information |
|---|---|
| CF 431 | Configuration Flag – If asserted, indicates that the device has been configured |
| CSS 432 | Command Sequence Start – Asserted to indicate the device to start recording command sequences |
| CSE 433 | Command Sequence End – Asserted to indicate the device to stop recording command sequences |
| SC 434 | Save Configure – Asserted to indicate the device to configure itself using saved command sequences |
| DC 435 | Default Configure – Asserted to indicate the device to configure itself to default command sequences |
| SCS 436 | Save Current Settings – Asserted to indicate the device to save the recorded command sequences |
| ICS 437 | Invalidate Current Settings – Asserted to indicate the device to discard the current saved command sequences |
| RSVD 438 | Reserved for future use |

*Fig. 4*

CONFIGURING A DEVICE FOR OPERATION ON A COMPUTING PLATFORM

RELATED APPLICATIONS

This application is related to commonly assigned U.S. application Ser. No. 11/540,374, filed by Ram Chary, Shreekant Thakkar, Pradeep Sebestian, Ulf Hanebutte and Shubha Kumbadakone on Sep. 29, 2006 and entitled "Method and Apparatus for Saving Power for a Computing System by Providing Instant-On Resuming from a Hibernation State", published as U.S. Patent Application Publication No. 2008/0082752 on Apr. 3, 2008.

BACKGROUND

Typically devices on a computing platform may go through at least a two-stage process to initialize and/or configure the device for operation on the computing platform. The first stage may occur during a transition from a low power state or following the initial start-up or "booting" of the computing system. This typically involves accessing basic input/output system (BIOS) information (e.g., in firmware). The BIOS information is then typically used to load applications on the computing platform such as an operation system (OS). Also, the computing system may use the BIOS to export system configuration information via some standard mechanism such as the Advanced Configuration and Power Interface (ACPI) to the OS to make the computing platform's BIOS independent of the OS and vice versa. The second stage typically involves configuring each device responsive to or resident on a computing platform. Traditionally, information embedded in or accessible to computing platform devices (e.g., firmware) and agents or drivers of the OS will both configure computing platform devices for operation on the computing platform. This typically results in a redundant configuration of computing platform devices, one configuration by firmware and an other by agents or drivers of the OS.

BRIEF DESCRIPTION OF THE DRAWINGS

FIG. 4 is an illustration of an example register and an example table for the device to decode the contents of the memory.

DETAILED DESCRIPTION

As mentioned in the background, a redundant configuration of computing platform devices may result from firmware and agents of an OS each configuring a device. This redundancy may cause extraneous delay in initializing and/or configuring a computing platform device for operation following a power cycle that includes an other boot-up or resumption to a normal operating state from a low power state. This extraneous delay may be burdensome to a user who wants to rapidly enter and exit power states (power cycles) for a device or an entire computing platform to conserve power and/or extend battery life.

In one example, a method is implemented that includes initializing a device following a power cycle. The initialization includes an agent for the device implementing one or more command sequences to configure the device for operation on a computing platform. The one or more implemented command sequences are recorded and a configuration flag is asserted to indicate the device has been configured for operation on the computing platform. The configuration flag is included in a command configuration register. At least a portion of the recorded one or more command sequences and the command configuration register are stored in a persistent memory that includes non-volatile memory resident on the device. Based on an other power cycle, the device is to access the command configuration register. Based on the command configuration register, the device is to determine whether it is to configure itself by implementing the one or more stored command sequences. The device then configures itself based on that determination.

Figure 1:
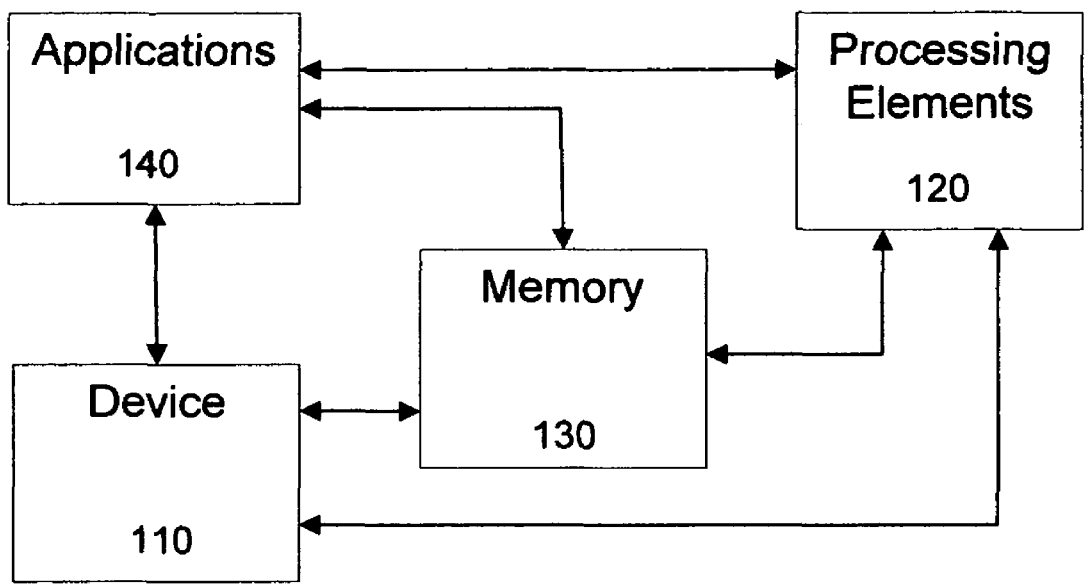
FIG. 1 is a block diagram of an example computing platform.

FIG. 1 is a block diagram of an example computing platform 100. Computing platform 100, for example, includes, but is not limited to, a computing platform for a two-way radio communication system, a one-way pager, a two-way pager, a personal communication system, a personal computer (e.g., laptop, desktop, notebook, ultra-mobile, etc.), a work station, a server, a personal digital assistant (PDAs), a digital broadband telephony device, a portable music, video or game player. In one implementation, as depicted in FIG. 1, computing platform 100 includes device 110, processing elements 120, memory 130 and applications 140.

As described more below, device 110, for example, is a device resident on computing platform 100 that includes elements to facilitate its initialization and/or configuration for operation on computing platform 100. Although not shown, computing platform 100 may include a plurality of devices that include some, all, or more elements than those described in this disclosure for device 110. In one example, device 110 may be a controller for one or more hardware components that may operate on and/or are responsive to computing platform 100. The controller may be a memory controller, an input/output (I/O) controller, a graphics controller, a network controller, etc. All or portions of these controllers, for example, may be part of a computing platform chipset.

Graphics controllers, for example, may include but are not limited to controllers that are part of internal and external graphics processors, application and/or function-specific accelerators that include but are not limited to Standard Definition (SD) and High Definition (HD) audio and video format (e.g., H.264) encoders, decoders and transcoders and digital television encoders, decoders and transcoders. Network controllers, for example, may include hardware, software and/or firmware to handle various wired or wireless communication protocols.

Hardware components, for example, may include input and/or output devices, e.g., video displays, mice, keyboard, finger-print readers, optical input readers such as projection keyboards as well as audio input and output devices. These hardware components, for example, may directly/remotely couple to device 110 and are accessed using wired and/or wireless communication protocols.

In one example, processing elements 120 represent any of a wide variety of logic device(s) or executable content to perform processing functions for computing platform 100. Processing elements 120, for example, include one or more of a microprocessor, network processor, service processor, microcontroller, field programmable gate array (FPGA), application specific integrated circuit (ASIC), sequestered thread or core of a multi-core/multi-threaded microprocessor, special operating mode of a processor or combination thereof.

In one implementation, memory 130 includes system memory that is used or accessible to devices and/or components resident on or responsive to computing platform 100. Also, memory 130 may include other memory that is only accessible to select devices or components (e.g., device 110) resident on computing platform. These select devices, for example, may store information (e.g., command sequences) in memory 130 to assist in the configuration of that device for operation on computing platform 100.

In one example, applications 140 includes a capability OS that responds to a user's request to process data or carry out a user initiated function for computing platform 100. Applications 140, for example, also may include a service OS to facilitate secure or remote management functions for computing platform 100. In addition to a capability OS and/or service OS, applications 140 or the OS may include agents to facilitate the initialization and/or configuration of devices (e.g., device 110) for operation on computing platform 100. These agents, for example, include device drivers that implement one or more command sequences to initialize and/or configure the device for operation on computing platform 100.

Figure 2:
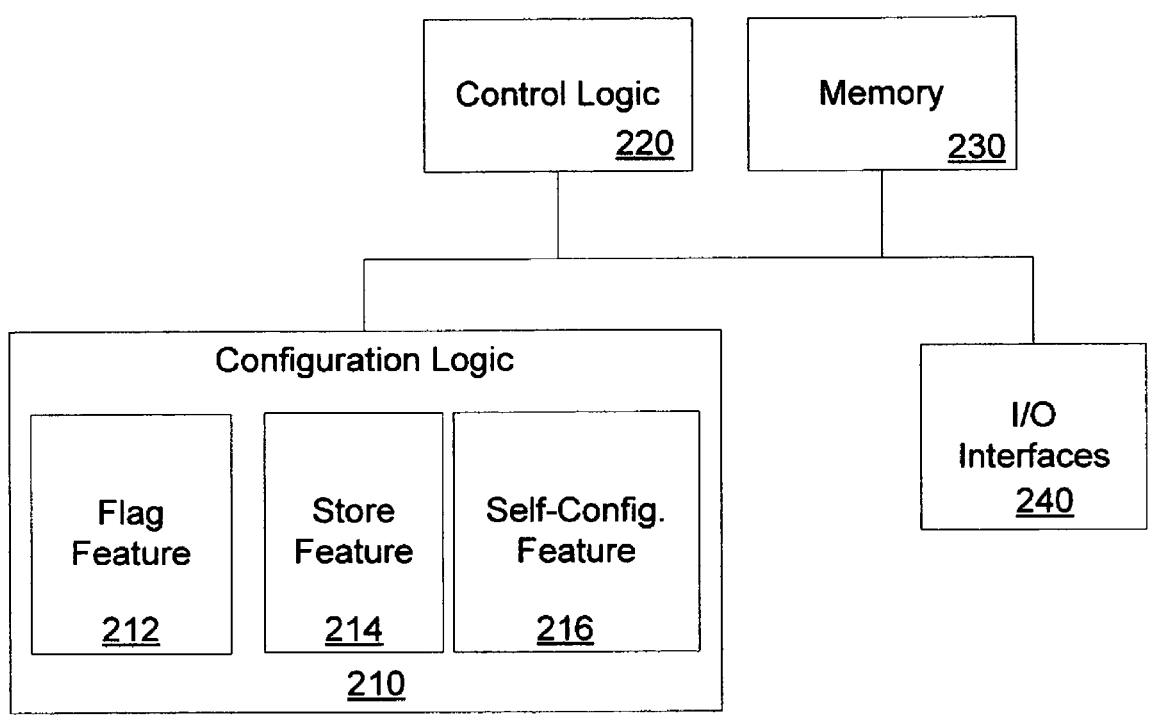
FIG. 2 is a block diagram of a device's example architecture.

FIG. 2 is a block diagram of device 110's architecture according to one example. In FIG. 2, device 110 includes configuration logic 210, control logic 220, memory 230 and I/O interfaces 240, each coupled as depicted.

In one example, the elements portrayed in FIG. 2's block diagram are those elements to facilitate the configuration of device 110 as described in this disclosure. For example, configuration logic 210 and control logic 220 each or collectively represent any of a wide variety of logic device(s) or executable content to implement the features of device 110 to enable device 110 to self-configure for operations on computing platform 100. These logic device(s) may include a microprocessor, network processor, service processor, microcontroller, FPGA, ASIC, sequestered thread or core of a multi-core/multi-threaded microprocessor, special operating mode of a processor or combination thereof.

In FIG. 2, configuration logic 210 includes flag feature 212, store feature 214 and self-configuration feature 216. In one implementation, configuration logic 210 uses these features to perform several functions. These functions, as described more below, for example, include asserting a configuration flag to indicate device 110 has been configured for operation on computing platform 100, storing one or more command sequences used to configure device 110, and obtaining those one or more command sequences to configure device 110 following a power cycle.

Control logic 220 may control the overall operation of device 110 and as mentioned above, may represent any of a wide variety of logic device(s) or executable content to implement the control of device 110. In alternate examples, the features and functionality of control logic 220 are implemented within configuration logic 210.

According to one example, at least a portion of memory 230 is memory that is used by the features of configuration logic 210 to at least temporarily store information to facilitate the configuration of device 110. In one example, memory 230 includes types of persistent memory that maintains stored information with little or no power. These types of persistent memory may include non-volatile types of memory (e.g., flash) or battery-backed memory (e.g., complementary metal-oxide semiconductor (CMOS)). In one implementation, types of persistent memory may include standard memory (e.g. dynamic random access memory) that may be in a "self-refresh" mode. In this mode, for example, periodic electrical refresh is instantiated on the memory (either by the memory itself or some other external component including memory controllers on the platform) in order to preserve context even when the system itself might be in a lower power state (e.g., a standby power state or a hibernate power state). The types of persistent memory included in memory 230, for example, are quickly assessable to the features of configuration logic 210 for those features to obtain information stored therein to self-configure device 110 following a power cycle. In that regard, at least a portion of the types of persistent memory (e.g., non-volatile portion) is resident on device 110.

In one implementation memory 230 may also store executable content (e.g., firmware). The executable content (e.g., default command sequences) may enable device 110 to be initially configured for operation on computing platform 100 following a power cycle. Executable content stored in memory 230 may also be used by control logic 220 and/or configuration logic 210 to implement or activate features to configure device 110 following an other power cycle.

I/O interfaces 240 may provide an interface via a communication medium or link between device 110 and elements resident on computing platform 100 or located remotely to computing platform 100. Also, I/O interface 240 may enable device 110 to interact with input and/or output devices. Input devices such as a mouse, keyboard, touchpad, etc. and/or output devices such as a display, etc. As a result, I/O interfaces 240 may enable configuration logic 210 or control logic 220 to receive a series of instructions from resident or remote elements as well as input and/or output devices. The series of instructions may enable configuration logic 210 and/or control logic 220 to implement one or more features of device 110.

Figure 3:
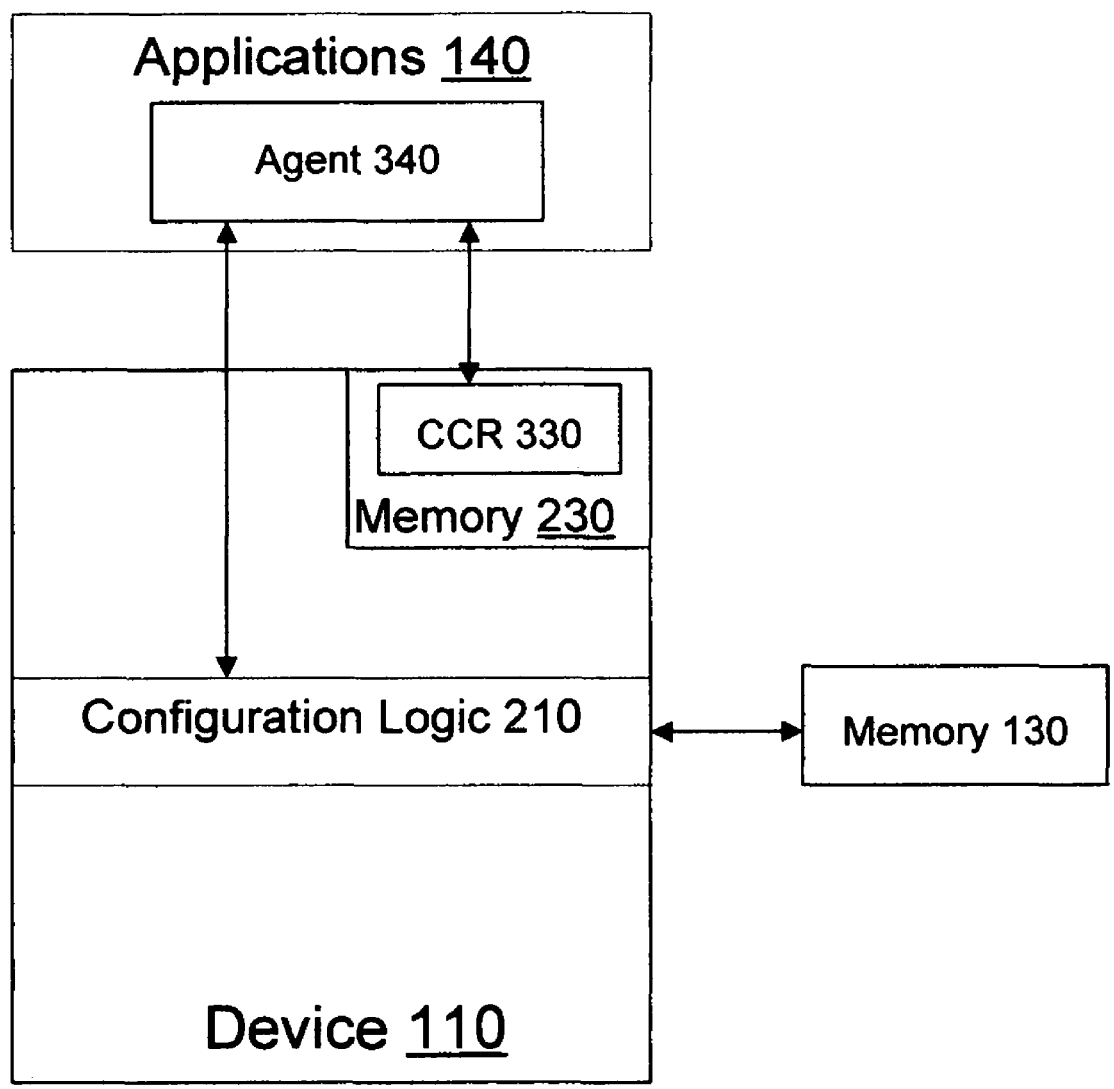
FIG. 3 is an example illustration of the device responsive to an agent.

FIG. 3 is an example illustration of device 110 responsive to agent 340. In one implementation, agent 340 is included in applications 140. For example, agent 340 is a device driver for an OS and is assigned or tasked to initialize and/or configure device 110 for operations on computing platform 100. In other example, agent 340 is a device driver for other interfaces such as an extensible firmware interface (EFI) or a universal extensible firmware interface (UEFI). In an other example, agent 340 may be a device driver for an interface for virtualization operations managed via a virtual machine monitor (VMM) that supports one or more virtual machines (VMs) operating on computing platform 100. In yet an other example, agent 340 may be an agent for an entity that operates independent of an OS on computing platform 100 (e.g., a power manager). This disclosure is not limited to only these examples of what agent 340 may be.

In one example, agent 340 initializes device 110 following a power cycle. The power cycle, for example, may be a power reset to device 110 or a power reset to all or a portion of computing platform 100. The power cycle may also be the initial power-up or boot up of computing platform 100. In one implementation, a power cycle includes a transition from a given power state (e.g., a low power state) to an other power state (e.g., a higher power or normal power state). For example, a power cycle may include transitioning from the various power states described in the Advanced Configuration Power Interface Specification, Revision 3.0a, published Dec. 30, 2005, and/or later revisions ("the ACPI Specification").

In one example, a power cycle includes computing platform 100 going through various power states in a pre-programmed manner even without user input or knowledge. These power states, for example, include on/off or from on state to standby/hibernate and back to on state. This power cycling, in one example, may occur when computing platform 100 automatically or periodically checks for e-mail and/or other content on a corporate or service provider server.

In one example, the initialization includes agent 340 implementing one or more command sequences to configure device 110 for operations on the computing platform. These command sequences, for example, cause device 110 to exchange information and carry out various timing sensitive actions to enable it to operate on computing platform 100. For example, device 110 is a memory controller for memory on computing platform 100 (e.g., memory 130). As part of one or more command sequences, for example, agent 340 will cause device 110 to execute commands to exchange information to indicate its capabilities, communication protocols, power requirements, etc. Device 110 responsive to or with the assistance of agent 340 may then execute commands to enable those capabilities, power up and initiate communications with other elements on or responsive to computing platform 100. These are just a few examples of command sequences to configure a device for operation and this disclosure is not limited to only the above examples.

In one implementation, configuration logic 210 of device 110 is activated to facilitate or assist agent 340 in initializing and/or configuring device 110. In one example, as depicted in FIG. 3, both configuration logic 210 and agent 340 have access to memory 230. In one example, following the configuration of device 110 for operations on computing platform 100, configuration logic 210 may assert a given bit in a register that is maintained or included in memory 230. This register, for example, is depicted in FIG. 3 as a command configuration register (CCR) 330. As described more below, the asserted bit may act as a flag (configuration flag) to indicate whether device 110 has been configured for operation on computing platform 100. Also, as described more for FIG. 4, CCR 330 includes other bits that may be asserted by agent 340 to facilitate device 110's configuration.

In one example, features of configuration logic 210 record the command sequence(s) implemented by agent 340 while configuring device 110 for operation on computing platform 100. These features may then store at least a portion of the command sequence(s) in a persistent memory included in memory 230. As mentioned above, this persistent memory may include non-volatile memory such as flash memory or battery-backed CMOS memory. Configuration logic 210, for example, may store an other portion of the command sequence(s) in memory that is shared by elements of computing platform 100. Thus as shown in FIG. 3, configuration logic 210 accesses memory 130 to store this other portion of the command sequence(s). This may occur, for example, if memory 230 has a limited capacity that cannot hold all of the command sequence(s) that may be used to configure device 110 for operation on computing platform 100.

In one example, following a power cycle, configuration logic 210 may obtain the command sequence(s) implemented by agent 340 to configure device 110 for operation on computing platform 100. As described more below, configuration logic 210 may also obtain CCR 330 and decode the bits in CCR 330 to configure device 110. This configuration, for example, is without the assistance of agent 340. Thus, in one example, agent 340 following the power cycle, accesses the CCR 330 and determines that a given bit or flag is asserted in CCR 330 that indicates device 110 is configured. In this example, agent 340 does not implement the one or more command sequences and thus redundant work is avoided when configuring device 110 for operation on computing platform 100.

FIG. 4 is an illustration of CCR 330 and an example table 430 to decode contents of one or more bits included in CCR 330. In one example, as portrayed in FIG. 4, CCR 330 includes an 8-bit register. Each bit of CCR 330, for example, may be selectively asserted (e.g., contains a value of 1) or de-asserted (e.g. contains a value of 0) to indicate to device 110 and/or an agent 340 certain actions to take when configuring device 110 for operations on computing platform 100. These bits are depicted in FIG. 4 as configuration flag (CF) 431, command sequence start (CSS) 432, command sequence end (CSE) 433, save configure (SC) 434, default configure (DC) 435, save current settings (SCS) 436, invalidate current settings (ICS) 437 and reserved (RSVD) 438 in bits 0-7 respectively. As mentioned above, CCR 330 may be stored in memory 230 of device 110.

In one implementation, table 430 is used by agent 340 and configuration logic 210 of device 110 to decode CCR 330. Table 430, for example, may be stored in a memory (e.g., memory 230) that is accessible to configuration logic 210 and agent 340 and used by these elements to configure device 110. CF 431, for example indicates whether device 110 has been configured. As mentioned above, configuration logic 210 may assert this bit or flag following the configuration of device 110 to avoid redundant efforts in configuring device 110 following a power cycle.

According to table 430, in one example, CSS 432 indicates whether to start recording command sequences; CSE 433 indicates whether to stop recording command sequences; SC 434 indicates whether to configure device 110 using save command sequences; DC 435 indicates whether to configure using default command sequences; SCS 436 indicates whether to save any recorded command sequences; ICS 437 indicates whether to invalidate or discard saved command sequences; and RSVD 437 is reserved.

According to one example, ICS 437 may be asserted based on an instance where one or more new command sequences or the current command sequences need updating. This may occur, for example, based on an update to agent 340, an update to firmware instructions maintain on device 110 or based on a device added or removed from computing platform 100. In either of these cases, agent 340 may assert ICS 437 to indicate to configuration logic 210 to discard previously saved command sequences. Thus, for example, configuration logic 210 will record and store the updated or new command sequences as they are implemented by agent 340.

Figure 5:
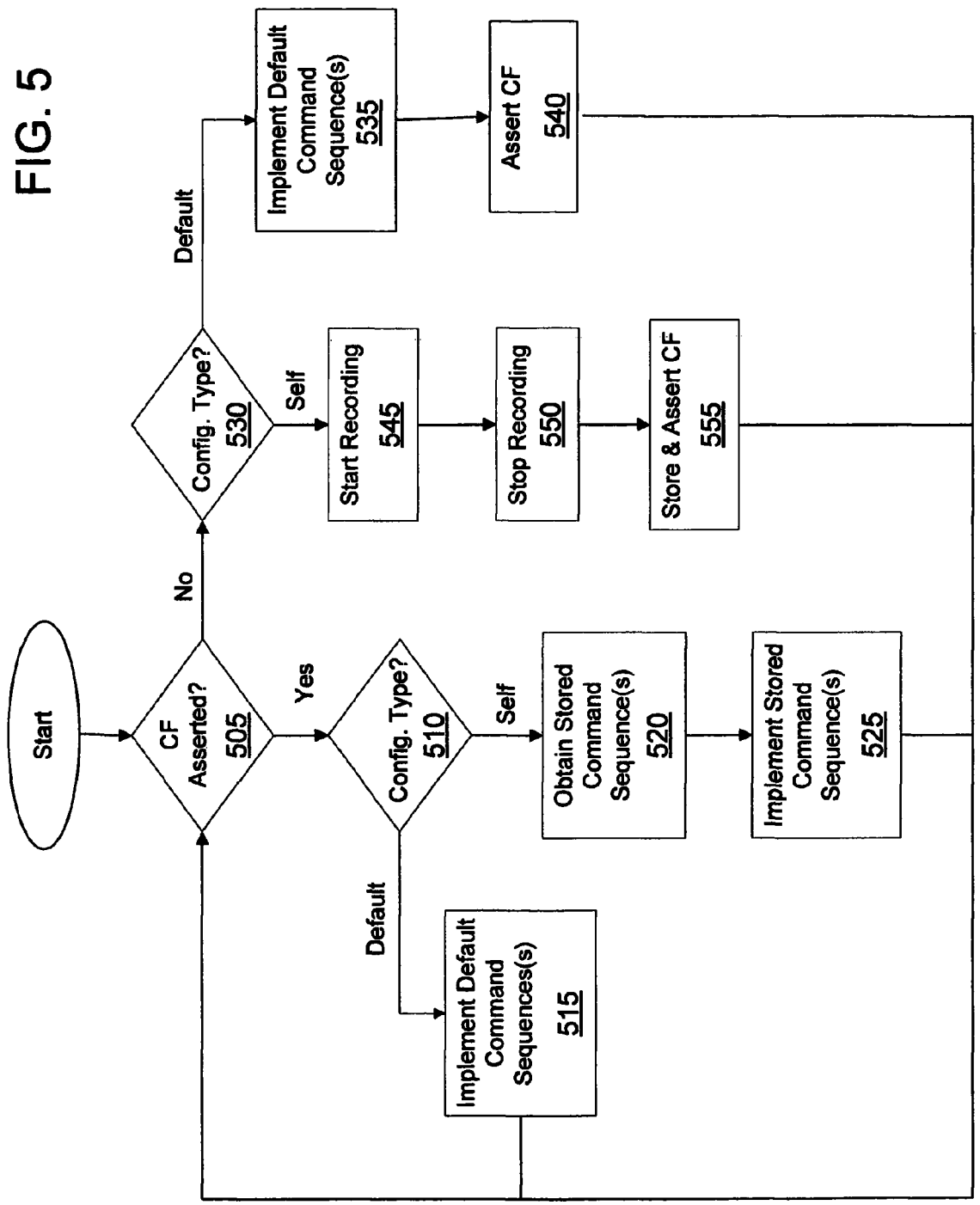
FIG. 5 is a flow chart of an example method to configure the device for operation on the computing platform.

FIG. 5 is a flow chart of an example method to configure device 110 for operation on computing platform 100. In one example, following a power cycle of device 110 and/or all or a portion of computing platform 100, configuration logic 210 activates flag feature 212. At block 505, for example, flag feature 212 accesses or obtains CCR 330 (e.g., from memory 230). Flag feature 212, for example, determines whether CF 431 is asserted.

At block 510, in one example, flag feature 212 has determined that CF 431 is asserted. Configuration logic 210, for example, activates self-configuration feature 216 to determine the type of configuration for device 110. In one example, to make this determination, self-configuration feature 216 accesses CCR 330 and determines whether SC 434 or DC 435 is asserted.

At block 515, in one example, DC 435 is asserted. This assertion, for example, indicates that device 110 is to be configured using one or more default command sequences. These default command sequences, for example, may be a minimum amount of command sequences that device 110 implements to at least configure itself to operate at a basic level. The one or more default command sequences may be maintained in a memory, e.g., memory 230 and/or non-volatile memory resident on device 110. These default command sequences, for example, were stored in the memory at the time device 110 was manufactured and may be used when device 110 is first powered up on computing platform 100. The one or more default command sequences may also be used if other command sequences are not working properly and the default command sequences are implemented to allow an agent (e.g., agent 340) to trouble shoot and possibly correct a faulty command sequence. In one example, the method starts over at block 505 following an other power cycle.

At block 520, in one example, SC 434 is asserted. This assertion, for example, indicates that device 110 is to be configured using saved command sequences. At block 525, for example, self-configuration feature 216 obtains saved command sequences (e.g., from memory 230 and/or memory 130). As mentioned previously, these saved command sequences may have been implemented by agent 340 to initialize and/or configure device 110. Self-configuration feature 216, for example, implements the saved command sequences to configure device 110 for operation on computing platform 100. In one example, the method starts over at block 505 following an other power cycle.

At block 530, in one example, flag feature 212 has determined that CF 431 is not asserted. Configuration logic 210, for example, activates self-configuration feature 216 to determine the type of configuration for device 110. Similar to block 510, in one example, to make this determination, self-configuration feature 216 accesses CCR 330 and determines whether SC 434 or DC 435 is asserted.

At block 535, in one example, DC 435 is asserted. This assertion, for example, indicates that device 110 is to be configured using default command sequences. Self-configuration feature 216, for example, implements the default command sequences to configure device 110 for operation on computing platform 100. At block 540, in one example, flag feature 212 asserts CF 431 to indicate that device 110 is configured. In one example, the method starts over at block 505 following an other power cycle.

At block 545, in one example, SC 434 is asserted. This assertion, for example, indicates that device 110 is to be configured using one or more saved command sequences. In one example, unlike at block 520, command sequences have yet to be recorded and saved. Thus, in this example, configuration logic 210 activates store feature 214 to monitor CSS 432 to determine when to start recording one or more command sequences implemented by agent 340 when configuring device 110. For example, agent 340 may assert CSS 432 to indicate a start to the recording. Based on that assertion of CSS 432, for example, store feature 214 starts recording the command sequences.

At block 550, in one example, store feature 214 monitors CSE 433 to determine when to stop recording the one or more command sequences implemented by agent 340. For example, agent 340 may assert CSS 432 to indicate that the one or more command sequences are complete and that recording can stop. Based on that assertion of CSE 433, for example, store feature 214 stops recording the one or more command sequences. At block 555, for example, flag feature 212 asserts CF 431 to indicate that device 110 is configured. Then, in one example, store feature 214 stores at least a portion of the implemented or recorded one or more command sequences in a persistent memory (included in memory 230) and also stores CCR 330 with CF 431 asserted in that persistent memory. In one example, the method starts over at block 505 following an other power cycle.

In one implementation, persistent memory (e.g., flash) included in memory 230 and used by store feature 214 to store the one or more command sequences and CCR 330 may include only enough persistent memory to hold a few command sequences or a portion of a single command sequence. In this case, a portion of the command sequences are also stored in memory 130 by store feature 214. For example, store feature 214 may store in memory 230 a portion of a command sequence that is implemented first and thus can minimize any latency impacts resulting from obtaining other portions of the command sequence from memory 130.

Although the example method in FIG. 4 depicts a given sequence of actions taken to transition a computing platform from a run to a low power system state, this disclosure is not limited to this particular sequence or order of actions. This disclosure may also include a sequence of actions that includes more or less actions as depicted and described for FIG. 4.

Although the example method in FIG. 5 depicts a given sequence of actions taken to configure a device for operation on a computing platform, this disclosure is not limited to this particular sequence or order of actions. This disclosure may also include a sequence of actions that includes more or less actions as depicted and described for FIG. 5.

Referring again to memory 130 in FIG. 1 and memory 230 in FIGS. 2 and 3. Memory 130 and 230 may include a wide variety of memory media including but not limited to volatile memory, non-volatile memory, flash, programmable variables or states, random access memory (RAM), read-only memory (ROM), flash, or other static or dynamic storage media. In one example, machine-readable instructions can be provided to memory 130 and/or memory 230 from a form of computer-readable medium. A computer readable medium includes: ROM; RAM; magnetic disk storage media; optical storage media; and flash memory devices.

References made in the specification to the term "responsive to" are not limited to responsiveness to only a particular feature and/or structure. A feature may also be "responsive to" an other feature and/or structure and also be located within that feature and/or structure. Additionally, the term "responsive to" may also be synonymous with other terms such as "communicatively coupled to" or "operatively coupled to," although the term is not limited in this regard.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

What is claimed is:

1. A method comprising:
   initializing a first device resident on a computer platform following a power cycle, the first device being one of a plurality of devices resident on the computing platform, the initialization to include a first agent for the first device implementing one or more command sequences to configure the first device for operation on the computing platform, the first agent being an application;
   recording the one or more implemented command sequences;
   asserting a configuration flag to indicate the first device has been configured for operation on the computing platform, the configuration flag included in a command configuration register of the first device; and
   storing at least a portion of the recorded one or more implemented command sequences and the command configuration register, wherein at least a portion of the one or more implemented command sequences and the command configuration register are stored in a persistent memory that includes non-volatile memory resident on the first device.

2. The method according to claim 1, further comprising:
the first device accessing the command configuration register based on a second power cycle; and
the first device determining whether the first device is to configure itself based on the configuration flag of the command configuration register.

3. The method according to claim 2, wherein the first device determines that it is to configure itself based on the configuration flag, and further comprising the first device configuring itself by obtaining the one or more stored command sequences and implementing the obtained one or more command sequences to configure the first device for operation on the computing platform.

4. The method according to claim 2, wherein the first device determines that it is to configure itself based on the configuration flag, and further comprising the first device configuring itself by implementing one or more default command sequences, the one or more default command sequences to include one or more command sequences maintained in the non-volatile memory resident on the first device.

5. The method according to claim 2, wherein the first device determines that it is not to configure itself based on the configuration flag, and further comprising:
the first agent not configuring the first device for operation on the computing platform.

6. The method according to claim 1, further comprising:
obtaining the command configuration register based on a second power cycle;
determining whether the first device is to discard the one or more stored command sequences based on the command configuration register; and
discarding the one or more stored command sequences based on the determination, wherein if the one or more stored command sequences are discarded further comprising:
recording one or more command sequences implemented by the first agent to configure the first device following the second power cycle; and
storing the recorded one or more implemented command sequences implemented by the first agent to configure the first device following the second power cycle.

7. The method according to claim 1, wherein the persistent memory that includes non-volatile memory resident on the first device further includes battery-backed complementary metal-oxide semiconductor (CMOS) memory.

8. The method according to claim 1, further comprising storing a second portion of the one or more implemented command sequences stored in a memory resident on the computing platform that is external to the first device.

9. The method according to claim 1, wherein a power cycle includes the first device transitioning to a higher power mode of operation from a mode of operation that includes one of:
a power off mode of operation and a low power mode of operation.

10. The method according to claim 1, wherein the first agent for the first device implementing one or more command sequences to configure the first device for operation on the computing platform comprises the first agent as a device driver for one of: an operating system, a virtual machine monitor, an extensible firmware interface and an universal extensible firmware interface.

11. An apparatus comprising:
a computing platform;
a plurality of devices on the computing platform, the plurality of devices including a first device; and
a plurality of applications, the applications including a first agent for the first device;
wherein the first device is responsive to the first agent, the first agent initializing the first device following a power cycle, the initialization to include the first agent implementing one or more command sequences to configure the first device for operation on the computing platform, the first device to include logic to:
record the one or more implemented command sequences;
assert a configuration flag to indicate the first device has been configured for operation on the computing platform, the configuration flag included in a command configuration register of the first device; and
store the one or more implemented command sequences and the command configuration register, wherein at least a first portion of the one or more implemented command sequences and the command configuration register are stored in a persistent memory that includes non-volatile memory resident on the first device.

12. The apparatus according to claim 11, further comprising the logic to:
access the command configuration register based on a second power cycle;
determine whether to configure the first device by implementing the one or more stored command sequences based on the contents of the command configuration register; and
configure the first device based on the determination.

13. The apparatus according to claim 12, wherein the logic to configure the first device based on the determination comprises the logic to configure the first device by obtaining the one or more stored command sequences and implementing the obtained one or more command sequences to configure the first device for operation on the computing platform.

14. The apparatus according to claim 12, wherein the logic to configure the first device based on the determination comprises the logic to configure the first device by implementing one or more default command sequences, the one or more default command sequences to include one or more command sequences maintained in the non-volatile memory resident on the first device.

15. The apparatus according to claim 11, further comprising the logic to:
obtain the command configuration register based on a second power cycle;
determine whether to discard the one or more stored command sequences based on the command configuration register; and
discard the one or more stored command sequences based on the determination, and, if the one or more stored command sequences are discarded, then:
record one or more command sequences implemented by the first agent to configure the first device following the second power cycle; and
store the recorded one or more implemented command sequences implemented by the first agent to configure the first device following the second power cycle.

16. The apparatus according to claim 11, wherein the persistent memory that includes non-volatile memory resident on the first device further includes battery-backed complementary metal-oxide semiconductor (CMOS) memory.

17. An apparatus according to claim 11, wherein a power cycle includes the first device transitioning to a higher power mode of operation from a mode of operation that includes one of: a power off mode of operation and a low power mode of operation.

18. A system comprising:
a computing platform;
an operating system for the computing platform, the operating system to include a first driver; and
a plurality of devices resident on the computing platform, the plurality of devices including a first device responsive to the first driver, the first driver to initialize the first device following a power cycle, the initialization to include the first driver implementing one or more command sequences to configure the first device for operation on the computing platform, the first device to include logic to:
record the one or more implemented command sequences;
assert a configuration flag to indicate the first device has been configured for operation on the computing platform, the configuration flag included in a command configuration register of the first device; and
store the one or more implemented command sequences and the command configuration register, wherein at least a portion of the one or more implemented command sequences and the command configuration register are stored in a persistent memory that includes non-volatile memory resident on the first device.

19. The system according to claim 18, further comprising the first device's logic to:
access the command configuration register based on a second power cycle;
determine whether to configure the first device by implementing the one or more stored command sequences based on the contents of the command configuration register; and
configure the first device based on the determination.

20. The system according to claim 19, wherein the first device's logic to configure the first device based on the determination comprises the first device's logic to configure the first device by obtaining the one or more stored command sequences and implementing the obtained one or more command sequences to configure the first device for operation on the computing platform.

21. The system according to claim 19, wherein the first device's logic to configure the first device based on the determination comprises the first device's logic to configure the first device by implementing one or more default command sequences, the one or more default command sequences to include one or more command sequences maintained in the non-volatile memory resident on the first device.

22. The system according to claim 19, further comprising:
the first driver accessing the command configuration register based on the second power cycle; and
the first driver not configuring the first device for operation on the computing platform based on the asserted configuration flag included in the command configuration register.

23. The system according to claim 18, further comprising the first device's logic to:
obtain the command configuration register based on a second power cycle;
determine whether to discard the one or more stored command sequences based on the command configuration register; and
discard the one or more stored command sequences based on the determination, and, if the one or more stored command sequences are discarded, then:
record one or more command sequences implemented by the first driver to configure the first device following the second power cycle; and
store the recorded one or more implemented command sequences implemented by the first driver to configure the first device following the second power cycle.

24. The system according to claim 18, wherein a power cycle includes the first device transitioning to a higher power mode of operation from a mode of operation that includes one of:
a power off mode of operation and a low power mode of operation.

25. A computer-readable medium comprising content, which, when executed by a processor causes the processor to:
initialize a first device resident on a computer platform following a power cycle, the first device being one of a plurality of devices resident on the computing platform, the initialization to include a first agent for the first device implementing one or more command sequences to configure the first device for operation on the computing platform, the first agent being an application;
record the one or more implemented command sequences;
assert a configuration flag to indicate the first device has been configured for operation on the computing platform, the configuration flag included in a command configuration register of the first device; and
store the recorded one or more implemented command sequences and the command configuration register, wherein at least a portion of the one or more implemented command sequences and the command configuration register are stored in a persistent memory that includes non-volatile memory resident on the first device.

26. The computer-readable medium according to claim 25, wherein the first device is to:
access the command configuration register based on a second power cycle;
determine whether the first device is to configure itself by implementing the one or more stored command sequences based on the contents of the command configuration register;
and configure itself based on the determination.

* * * * *